United States Patent
Ho et al.

(10) Patent No.: US 7,363,408 B2
(45) Date of Patent: Apr. 22, 2008

(54) INTERRUPTION CONTROL SYSTEM AND METHOD

(75) Inventors: Tony Ho, Taipei (TW); Chung-Ching Huang, Taipei (TW); Norman Chung, Taipei (TW)

(73) Assignee: Via Technologies, Inc., Taipei (TW)

( * ) Notice: Subject to any disclaimer, the term of this patent is extended or adjusted under 35 U.S.C. 154(b) by 177 days.

(21) Appl. No.: 11/000,300

(22) Filed: Nov. 30, 2004

(65) Prior Publication Data
US 2005/0120154 A1 Jun. 2, 2005

(30) Foreign Application Priority Data
Dec. 2, 2003 (TW) .............. 92133938 A

(51) Int. Cl.
*G06F 13/24* (2006.01)
(52) U.S. Cl. .................................... 710/260
(58) Field of Classification Search ............... 713/320, 713/322, 323, 324, 601; 710/260
See application file for complete search history.

(56) References Cited

U.S. PATENT DOCUMENTS

| | | | | |
|---|---|---|---|---|
| 4,611,289 A | * | 9/1986 | Coppola ................ | 713/300 |
| 4,980,836 A | * | 12/1990 | Carter et al. .......... | 713/322 |
| 5,218,704 A | * | 6/1993 | Watts et al. .......... | 713/322 |
| 5,396,635 A | * | 3/1995 | Fung ..................... | 713/323 |
| 5,504,907 A | * | 4/1996 | Stewart et al. ........ | 713/324 |
| 5,659,762 A | * | 8/1997 | Sawada et al. ........ | 713/323 |
| 5,854,908 A | * | 12/1998 | Ogilvie et al. ........ | 710/312 |
| 5,878,251 A | * | 3/1999 | Hagiwara et al. ..... | 713/601 |
| 5,996,083 A | * | 11/1999 | Gupta et al. .......... | 713/322 |
| 6,529,530 B1 | * | 3/2003 | Ichii et al. ............ | 370/537 |
| 6,584,573 B1 | * | 6/2003 | Wunderlich et al. .. | 713/322 |
| 6,665,802 B1 | * | 12/2003 | Ober ..................... | 713/320 |
| 2001/0032287 A1 | * | 10/2001 | Lai et al. .............. | 710/260 |

* cited by examiner

*Primary Examiner*—Rehana Perveen
*Assistant Examiner*—Mohammed H Rehman
(74) *Attorney, Agent, or Firm*—Kirton & McConkie; Evan R. Witt

(57) ABSTRACT

An interruption control system includes an interruption message generator, a stop clock control module and an interruption status indicating path. The interruption message generator is used for decoding and identifying a message signaled interrupt (MSI) issued by a first peripheral device or a second peripheral device when interruption is to be conducted, and generates an interruption status indicating message in response to the message signaled interrupt (MSI). The stop clock control module is coupled to the interruption message generator and the CPU and de-asserts a stop clock signal that is previously asserted to have the CPU enter a power-saving state to have the CPU deactivate the power-saving state in response to the interruption status indicating message. The interruption status indicating path is used for transmitting the interruption status indicating message.

15 Claims, 4 Drawing Sheets

INTERRUPTION CONTROL SYSTEM AND METHOD

FIELD OF THE INVENTION

The present invention relates to an interruption control system, and more particularly to an interruption control system for use with a computer system. The present invention also relates to an interruption control method of a computer system.

BACKGROUND OF THE INVENTION

Power-saving means is widely used to minimize power consumption in a computer system. Many kinds and levels of power-saving modes are developed to achieve the purpose. One of the examples is so-called as ACPI. ACPI (Advanced Configuration and Power Management Interface) is a specification defining standard interfaces for hardware configuration and power management of the power-saving means. According to the ACPI specification, the central processing unit (CPU) of the computer system operates in various power states, e.g. C1, C2, C3, etc. Different power states result in different levels of power saving effects. For any power-saving mechanism, it is important to reduce power consumption while providing a stable operational environment for circuit at a relatively low temperature.

Generally speaking, the power management for the CPU of the computer system is implemented with the south bridge chip of the chipset. Referring to a conventional computer scheme of FIG. 1, for activating and deactivating power-saving modes, the south bridge chip 2 includes a stop clock control module 20 coupled to the CPU 1 and north bridge chip 3, and an interrupt control device 22 coupled to the stop clock control module 20 and one or more peripheral equipment, e.g. peripheral device 4.

When the operating system (OS) of the computer system is to enter a power-saving state, the CPU 1 asserts a sleep command to the south bridge chip 2. In response to the sleep command, the stop clock control module 20 of the south bridge chip 2 asserts a stop clock signal STPCLK# to the CPU 1 via a clock signal pin 21. Once the STPCLK# signal is generated, the CPU 1 asserts a stop grant signal STPGNT to the south bridge chip 2 via the north bridge chip 3 through data buses connecting thereto. In response to the STPGNT signal, the CPU 1, as well as the entire computer system, enters the power-saving state so as to reduce power consumption.

Afterwards, the CPU 1 can be awaked when interrupted by any of the peripheral devices. For example, in response to the receipt of an interrupt signal asserted by the peripheral device 4 via the interrupt signal pin 40, the interrupt control device 22 of the south bridge chip 2 issues a wake-up signal to trigger the stop clock control module 20 of the south bridge chip 2 to de-assert the STPCLK# signal. Thus, the CPU 1 and the entire computer system are awaked to recover to the normal operation state.

With the increasing number and variety of peripheral devices and promotion of computer performance, new and diverse architectures of computer systems have been developed. Particularly, as shown in FIG. 2, peripheral equipment such as peripheral device 6 can be connected to the north bridge chip 3 other than the south bridge chip 2. The peripheral device 6 is communicable with the north bridge chip 3 via a PCI (peripheral component interconnect)-to-PCI bridge device 5. In the configuration, the interruption signal issued by the peripheral device 6, however, cannot be transmitted to the south bridge chip 2 to de-assert the STPCLK# signal.

SUMMARY OF THE INVENTION

The present invention provides an interruption control system for use with a computer system, which can effectively wake up the computer system from the power-saving state to the normal operation state when any peripheral device asserts an interrupt signal.

As is known to those skilled in the art, a message signaled interrupt (MSI) derived from the PCI specification is asserted accompanying the interruption signal from the peripheral device (for example, the device 4 or 6 in FIG. 2). The message signaled interrupt (MSI) is generally in a memory write cycle format complying with the memory coupled to the north bridge chip (for example the memory 31 in FIG. 2). The message signaled interrupt (MSI) issued by the peripheral device 4 will be transmitted to the south bridge chip 2 via the PCI bus 40, and further transmitted to the north bridge chip 3 via the bus between the south bridge chip and the north bridge chip. On the other hand, when the message signaled interrupt (MSI) is issued by the peripheral device 6, it will be transmitted to the PCI-to-PCI bridge device 5 via the PCI bus 60 and further transmitted to the north bridge chip 3 via a data bus between the PCI-to-PCI bridge device 5 and the north bridge chip 3. In other words, the message signaled interrupt (MSI) will not be transmitted to the south bridge chip 2 in current design.

The present invention relates to an interruption control system for use with a computer system. The computer system comprises a CPU, a north bridge chip, a south bridge chip, a first peripheral device coupled to the south bridge chip and a second peripheral device coupled to the north bridge chip via a bus bridge chip. The interruption control system comprises an interruption message generator, a stop clock control module and an interruption status indicating path. The interruption message generator is used for decoding and identifying a message signaled interrupt (MSI) issued by the first peripheral device or the second peripheral device when interruption is to be conducted, and generates an interruption status indicating message in response to the message signaled interrupt (MSI). The stop clock control module is coupled to the interruption message generator and the CPU and de-asserts a stop clock signal that is previously asserted to have the CPU enter a power-saving state to have the CPU deactivate the power-saving state in response to the interruption status indicating message. The interruption status indicating path is used for transmitting the interruption status indicating message.

In an embodiment, the interruption message generator is the north bridge chip.

In an embodiment, the stop clock control module is incorporated in the south bridge chip.

In an embodiment, the bus bridge chip is a PCI-to-PCI bridge chip.

In an embodiment, the interruption status indicating path is an interruption status indicating pin electrically connected between the north bridge chip and the stop clock control module for transmitting the interruption status indicating message from the north bridge chip to the stop clock control module.

In an embodiment, the interruption message generator is the north bridge chip, the stop clock control module is incorporated in the south bridge chip, and the interruption status indicating path includes a data bus between the north bridge chip and the south bridge chip.

The present invention relates to another interruption control system. The interruption control system comprises a CPU, a south bridge chip, a north bridge chip and an interruption status indicating path. The south bridge chip comprises a stop clock control module asserting a stop clock signal to the CPU in a power-saving mode and de-asserting the stop clock signal in an interruption mode. The north bridge chip is coupled to a bus bridge chip, decodes and identifies a message signaled interrupt (MSI) issued by a first peripheral device coupled to the south bridge chip or a second peripheral device coupled to the bus bridge chip, and generates an interruption status indicating message in response to the message signaled interrupt (MSI). The interruption status indicating path is used for transmitting the interruption status indicating message from the north bridge chip to the stop clock control module of the south bridge chip to deactivate a power-saving state of the computer system in response to the interruption status indicating message.

In an embodiment, the first peripheral device is coupled to the south bridge chip via a PCI bus, and the second peripheral device is coupled to the bus bridge chip via another PCI bus.

In an embodiment, the interruption status indicating path is an interruption status indicating pin electrically connected between the north bridge chip and the stop clock control module of the south bridge chip. Alternatively, the interruption status indicating path includes a data bus between the north bridge chip and the south bridge chip.

The present invention also relates to an interruption control method of a computer system. The computer system comprises a CPU, a north bridge chip, a south bridge chip, a first peripheral device coupled to the south bridge chip and a second peripheral device coupled to the north bridge chip via a bus bridge chip. Firstly, a message signaled interrupt (MSI) is issued from the second peripheral device and the message signaled interrupt (MSI) is transmitted to the north bridge chip via the bus bridge chip when an interruption is asserted by the second peripheral device. Then, the message signaled interrupt (MSI) issued by the second peripheral device is decoded and identified, and an interruption status indicating message is generated in response to the message signaled interrupt (MSI). Afterward, a stop clock signal that is previously asserted by the south bridge chip is de-asserted to deactivate a power-saving state of the computer system in response to the interruption status indicating message transmitted to the south bridge chip.

In an embodiment, the method further comprises the following steps. A message signaled interrupt (MSI) is issued from the first peripheral device and the message signaled interrupt (MSI) is transmitted to the north bridge chip via the south bridge chip when an interruption is asserted by the first peripheral device. Then, the message signaled interrupt (MSI) issued by the first peripheral device is decoded and identified, and the interruption status indicating message is generated in response to the message signaled interrupt (MSI). Afterward, the stop clock signal is de-asserted to deactivate the power-saving state of the computer system in response to the interruption status indicating message transmitted to the south bridge chip.

In an embodiment, the interruption status indicating message is transmitted from the north bridge chip to the south bridge chip via a data bus between the north bridge chip and the south bridge chip.

In an embodiment, the interruption status indicating message is transmitted from the north bridge chip to the south bridge chip via an interruption status indicating pin electrically connected between the north bridge chip and a stop clock control module of the south bridge chip and the stop clock signal is asserted and de-asserted by the stop clock control module.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
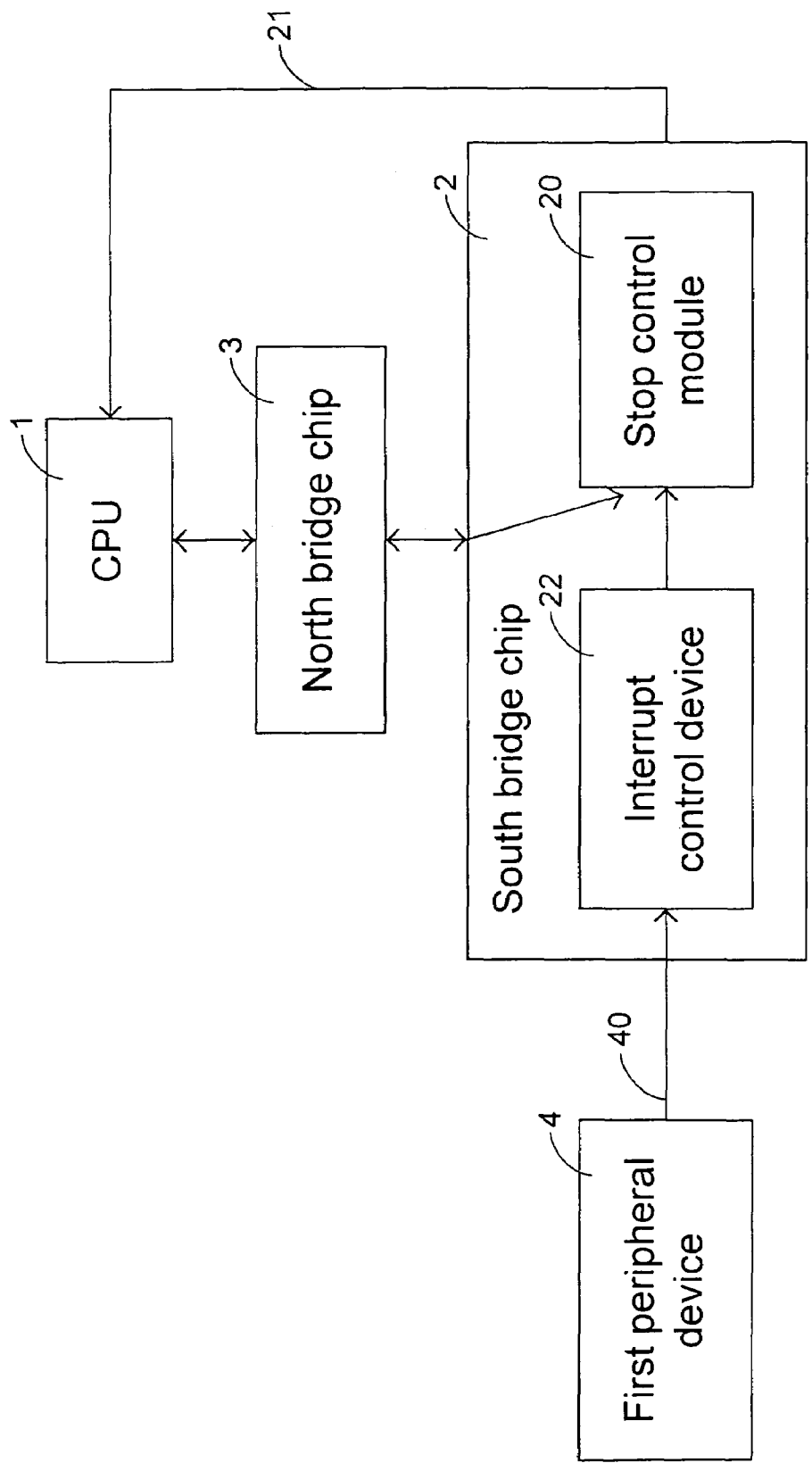
FIG. 1 is a functional block diagram illustrating a conventional interruption control means of a computer system.
Figure 2:
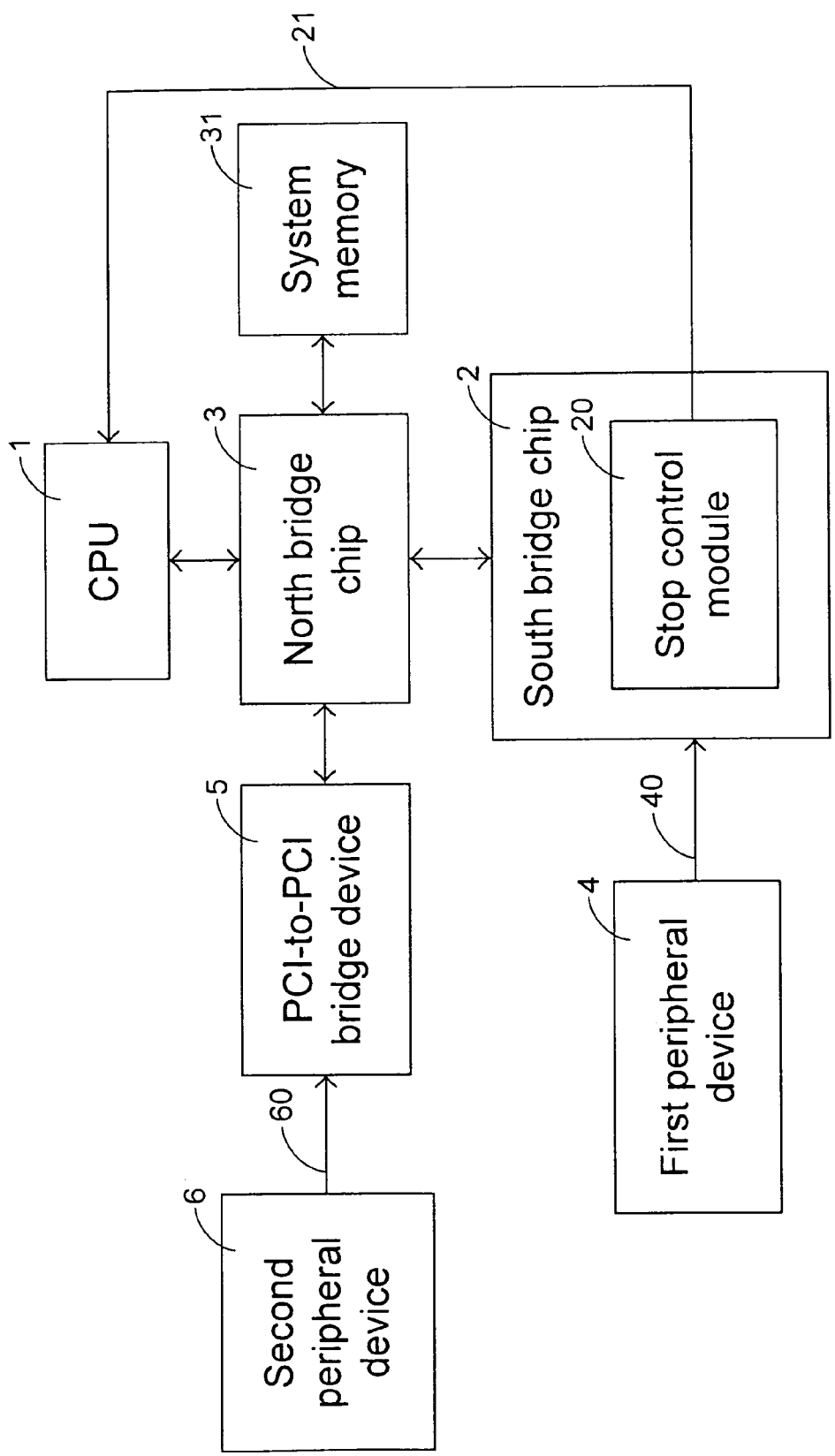
FIG. 2 is a functional block diagram illustrating another conventional interruption control means of a computer system.
Figure 3:
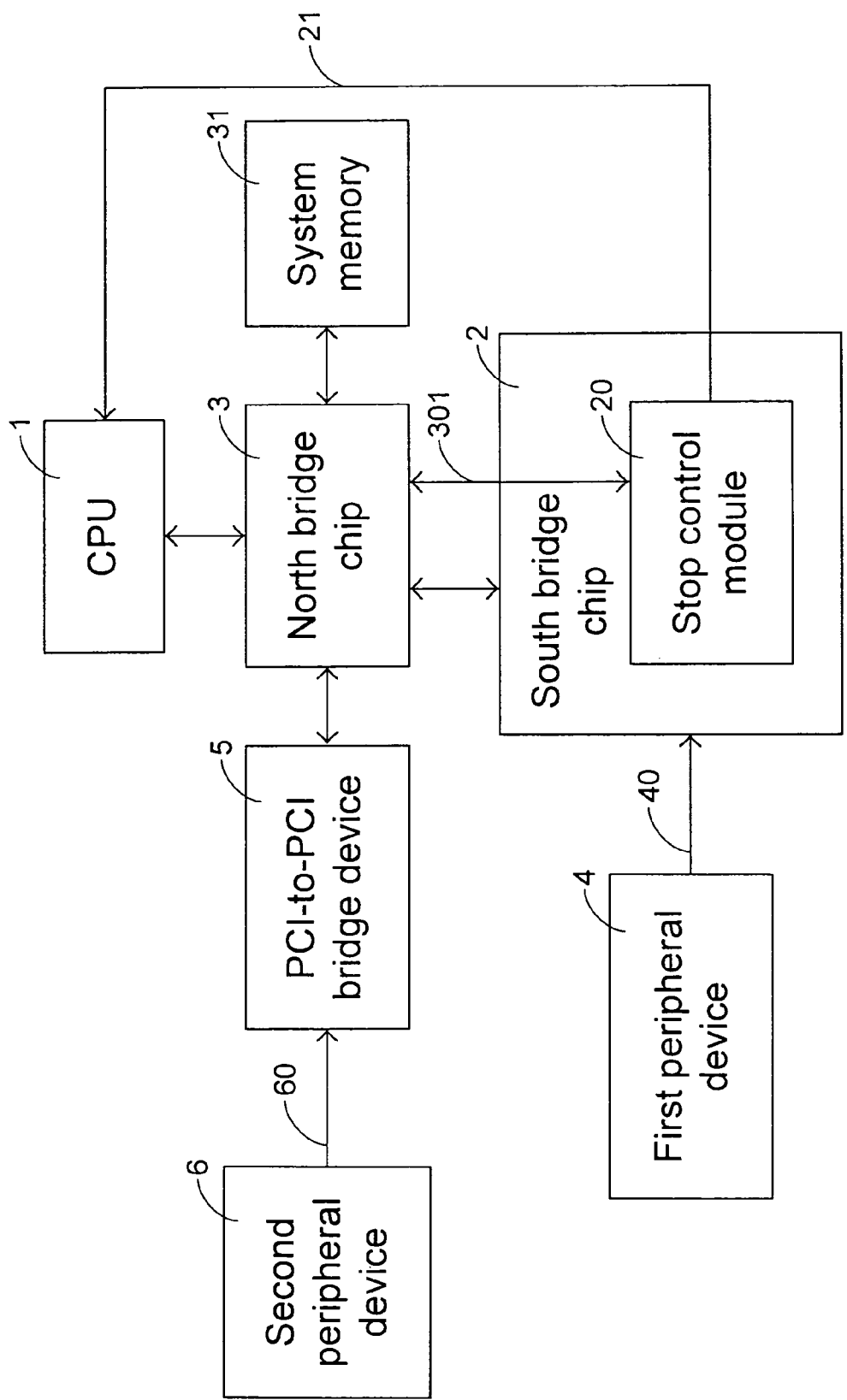
FIG. 3 is a functional block diagram illustrating an interruption control system according to a preferred embodiment of the present invention.

Referring to FIG. 3, an interruption control system according to a preferred embodiment of the present invention is shown. In the interruption control system, a first peripheral device 4 is coupled to the south bridge chip 2 where a stop clock control module 20 is arranged, and a second peripheral device 6 is coupled to the north bridge chip 3 via a PCI-to-PCI bridge device 5. The north bridge chip 3 communicates with the stop clock control module 20 of the south bridge chip 2 via an interruption status indicating pin 301.

When the computer system is going to enter a power-saving state in response to the request from the operating system (OS), the CPU 1 asserts a sleep command to the south bridge chip 2. In response to the sleep command, the stop clock control module 20 of the south bridge chip 2 asserts a stop clock signal STPCLK# to the CPU 1 via a clock signal pin 21. Once the STPCLK# signal is generated, the CPU 1 issues a stop grant signal STPGNT to the south bridge chip 2 via the north bridge chip 3 through data buses connecting thereto. In response to the STPGNT signal, the CPU 1, as well as the entire computer system, enters the power-saving state, e.g. C2 or C3 mode, so as to reduce power consumption.

As known, a message signaled interrupt (MSI) derived from the PCI specification is asserted accompanying the interruption signal from the first peripheral device 4 and/or the second peripheral device 6. The message signaled interrupt (MSI) is generally in a memory write cycle format complying with the system memory 31 coupled to the north bridge chip 3. Once a message signaled interrupt (MSI) is issued by the peripheral device 4, the message signaled interrupt (MSI) will be transmitted to the south bridge chip 2 via the PCI bus 40, and further transmitted to the north bridge chip 3 via the bus between the south bridge chip 2 and the north bridge chip 3. The message signaled interrupt (MSI) is decoded and identified by the north bridge chip 3. Then, an interruption status indicating message is generated in response to the message signaled interrupt (MSI) and transmitted to the stop clock control module 20 of the south bridge chip 2 via the interruption status indicating pin 301 to de-assert the STPCLK# signal, thereby deactivating the power-saving state of the computer system.

On the other hand, when the message signaled interrupt (MSI) is issued by the peripheral device 6, it will be transmitted to the PCI-to-PCI bridge device 5 via the PCI bus 60 and further transmitted to the north bridge chip 3 via a data bus between the PCI-to-PCI bridge device 5 and the north bridge chip 3. Likewise, after the message signaled interrupt (MSI) has been decoded and identified by the north bridge chip 3, an interruption status indicating message in response to the message signaled interrupt (MSI) is generated. The interruption status indicating message is transmitted to the stop clock control module 20 of the south bridge chip 2 via the interruption status indicating pin 301 to de-assert the STPCLK# signal. Accordingly, the power-saving state of the computer system is deactivated, and the CPU 1 and the entire computer system are awaked to recover to the normal operation state.

It is understood from the above embodiment, the interruption control system of the present invention can effectively wake up the computer system from the power-saving state to the normal operation state when either the peripheral device coupled to the south bridge chip or the peripheral device not coupled to the south bridge chip issues a message signaled interrupt (MSI).

Figure 4:
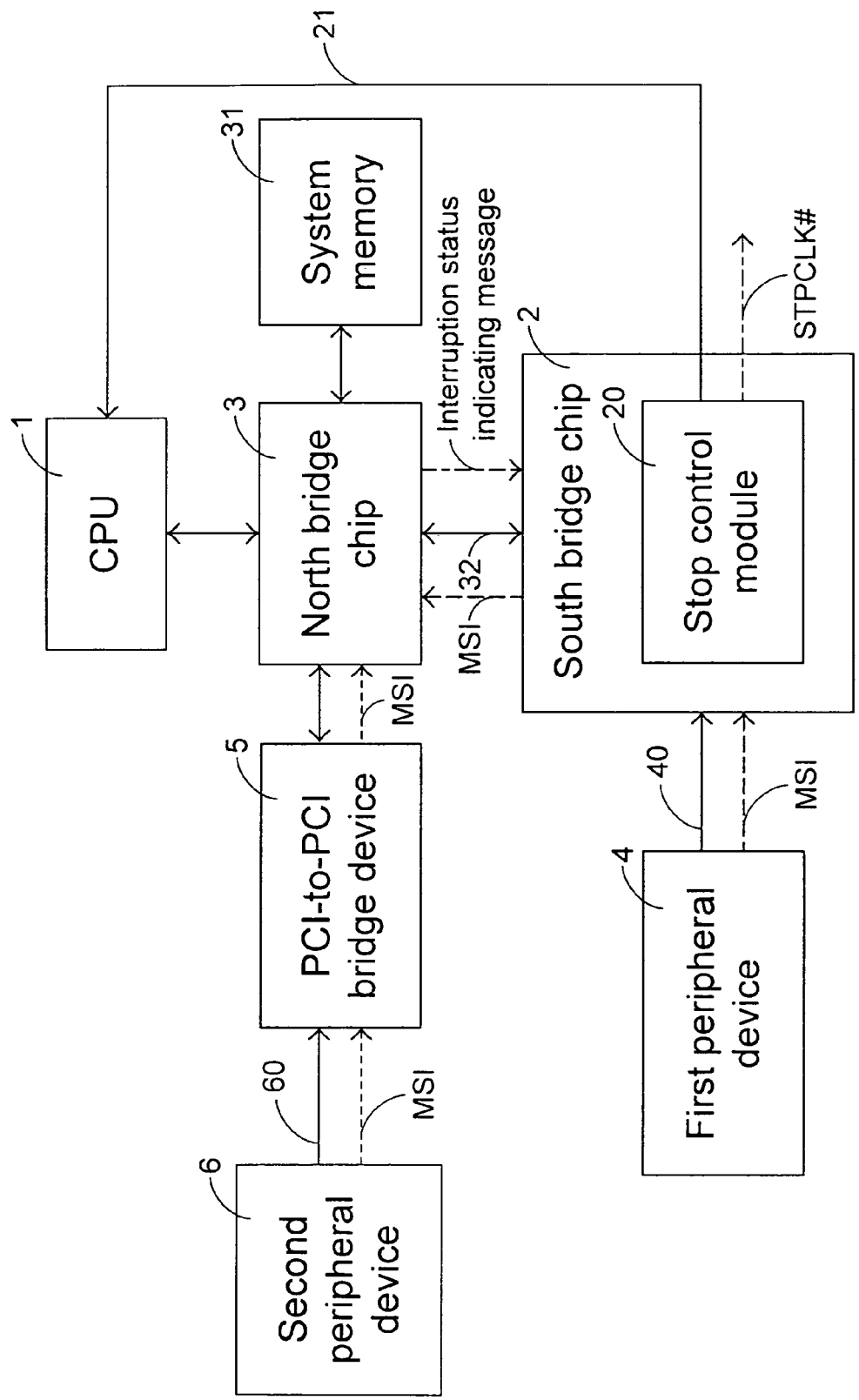
FIG. 4 is a functional block diagram illustrating an interruption control system according to another preferred embodiment of the present invention.

The embodiment shown in FIG. 3 utilizes an additional pin 301 to convey the interruption status indicating message. Alternatively, the interruption status indicating message can be conveyed under the existent structure according to the embodiment illustrated in FIG. 4. In the figure, the transmission of associated signals is indicated with dash lines. In this embodiment, the interruption status indicating message generated from the north bridge chip 3 in response to the message signaled interrupt (MSI) issued by the first peripheral device 4 or the second peripheral device 6 is made to be transmitted to the stop clock control module 20 via a data bus 32 between the north bridge chip 3 and the south bridge chip 2. In response to the interruption status indicating message from the north bridge chip 3, the stop clock signal STPCLK# is de-asserted from the stop clock control module 20 of the south bridge chip 2 to deactivate the power saving state of the computer system. In this embodiment, the interruption control can be accomplished without increasing the pin number.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interruption control system for use with a computer system, said computer system comprising a CPU, a north bridge chip, a south bridge chip, a first peripheral device coupled to said south bridge chip and a second peripheral device coupled to said north bridge chip via a bus bridge chip, said interrupt control system comprising:
    an interruption message generator for decoding and identifying a message signaled interrupt (MSI) issued by said first peripheral device or said second peripheral device when interruption is to be conducted, and generating an interruption status indicating message in response to said message signaled interrupt (MSI);
    a stop clock control module coupled to said interruption message generator and said CPU and de-asserting a stop clock signal that is previously asserted to have said CPU enter a power-saving state to have said CPU deactivate said power-saving state in response to said interruption status indicating message; and
    an interruption status indicating path for transmitting said interruption status indicating message.

2. The interruption control system according to claim 1 wherein said interruption message generator is said north bridge chip.

3. The interruption control system according to claim 1 wherein said stop clock control module is incorporated in said south bridge chip.

4. The interruption control system according to claim 1 wherein said bus bridge chip is a PCI-to-PCI bridge chip.

5. The interruption control system according to claim 1 wherein said interruption status indicating path is an interruption status indicating pin electrically connected between said north bridge chip and said stop clock control module for transmitting said interruption status indicating message from said north bridge chip to said stop clock control module.

6. The interruption control system according to claim 1 wherein said interruption message generator is said north bridge chip, said stop clock control module is incorporated in said south bridge chip, and said interruption status indicating path includes a data bus between said north bridge chip and said south bridge chip.

7. An interruption control system, comprising:
    a CPU;
    a south bridge chip comprising a stop clock control module asserting a stop clock signal to said CPU in a power-saving mode and de-asserting said stop clock signal in an interruption mode;
    a north bridge chip coupled to a bus bridge chip, decoding and identifying a message signaled interrupt (MSI) issued by a first peripheral device coupled to said south bridge chip or a second peripheral device coupled to said bus bridge chip, and generating an interruption status indicating message in response to said message signaled interrupt (MSI); and
    an interruption status indicating path for transmitting said interruption status indicating message from said north bridge chip to said stop clock control module of said south bridge chip to deactivate a power-saving state of said computer system in response to said interruption status indicating message.

8. The interruption control system according to claim 7 wherein said bus bridge chip is a PCI-to-PCI bridge chip.

9. The interruption control system according to claim 7 wherein said first peripheral device is coupled to said south bridge chip via a PCI bus, and said second peripheral device is coupled to said bus bridge chip via another PCI bus.

10. The interruption control system according to claim 7 wherein said interruption status indicating path is an interruption status indicating pin electrically connected between said north bridge chip and said stop clock control module of said south bridge chip.

11. The interruption control system according to claim 7 wherein said interruption status indicating path includes a data bus between said north bridge chip and said south bridge chip.

12. An interruption control method of a computer system, said computer system comprising a CPU, a north bridge chip, a south bridge chip, a first peripheral device coupled to said south bridge chip and a second peripheral device coupled to said north bridge chip via a bus bridge chip, said method comprising steps of:

issuing a message signaled interrupt (MSI) from said second peripheral device and transmitting said message signaled interrupt (MSI) to said north bridge chip via said bus bridge chip when an interruption is asserted by said second peripheral device;

decoding and identifying said message signaled interrupt (MSI) issued by said second peripheral device, and generating an interruption status indicating message in response to said message signaled interrupt (MSI); and de-asserting a stop clock signal that is previously asserted by said south bridge chip to deactivate a power-saving state of said computer system in response to said interruption status indicating message transmitted to said south bridge chip.

13. The method according to claim 12 further comprising steps of:

issuing a message signaled interrupt (MSI) from said first peripheral device and transmitting said message signaled interrupt (MSI) to said north bridge chip via said south bridge chip when an interruption is asserted by said first peripheral device;

decoding and identifying said message signaled interrupt (MSI) issued by said first peripheral device, and generating said interruption status indicating message in response to said message signaled interrupt (MSI); and de-asserting said stop clock signal to deactivate said power-saving state of said computer system in response to said interruption status indicating message transmitted to said south bridge chip.

14. The method according to claim 12 wherein said interruption status indicating message is transmitted from said north bridge chip to said south bridge chip via a data bus between said north bridge chip and said south bridge chip.

15. The method according to claim 12 wherein said interruption status indicating message is transmitted from said north bridge chip to said south bridge chip via an interruption status indicating pin electrically connected between said north bridge chip and a stop clock control module of said south bridge chip and said stop clock signal is asserted and de-asserted by said stop clock control module.

* * * * *